United States Patent
Lange

(10) Patent No.: US 7,401,187 B2
(45) Date of Patent: Jul. 15, 2008

(54) METHOD AND APPARATUS FOR READING A DATA STORE

(75) Inventor: Stephan J. Lange, St. Leon-Rot (DE)

(73) Assignee: SAP AG, Walldorf (DE)

( * ) Notice: Subject to any disclaimer, the term of this patent is extended or adjusted under 35 U.S.C. 154(b) by 520 days.

(21) Appl. No.: 10/938,150

(22) Filed: Sep. 10, 2004

(65) Prior Publication Data

US 2006/0059313 A1  Mar. 16, 2006

(51) Int. Cl.
*G06F 12/02* (2006.01)
(52) U.S. Cl. ........................ 711/138; 711/112
(58) Field of Classification Search ............... 711/100, 711/154, 156, 138, 112; 707/1, 200, 102; 715/526, 733, 500, 516
See application file for complete search history.

(56) References Cited

U.S. PATENT DOCUMENTS 5,600,833 A * 2/1997 Senn et al. ............... 707/1
5,613,134 A * 3/1997 Lucus et al. ............. 715/526
6,167,409 A * 12/2000 DeRose et al. ........... 715/513
6,582,474 B2 * 6/2003 LaMarca et al. .......... 715/500

OTHER PUBLICATIONS

Rosenblum et al., "The Design and Implementation of a Log-Structure File System," Operating Systems Review SIGOPS, vol. 25, No. 5, New York, US, pp. 1-15 (May 1991).*
Armstead et al.; "Implementation of a Campus-wide Distributed Mass Storage Service: The Dream vs. Reality," IEEE, 1995, pp. 190-199.*
Jander, M.: "Launching Storage-Area Net", Data Communications, U.S, McGraw Hill, NY, vol. 27, No. 4 (Mar. 21, 1988), pp. 64-72.*

* cited by examiner

*Primary Examiner*—Pierre-Michel Bataille
(74) *Attorney, Agent, or Firm*—Blakely, Sokoloff, Taylor & Zafman LLP

(57) ABSTRACT

In an electronic computing system, an instruction is provided as to whether to cache in a region of a memory of the system an attribute of a context if and when the context is accessed in a permanent storage device. When the context is accessed in the permanent storage, the attribute of the accessed context is cached or not in the memory region according to the instruction.

32 Claims, 3 Drawing Sheets

METHOD AND APPARATUS FOR READING A DATA STORE

TECHNICAL FIELD

The invention generally relates to the field of data storage. In particular, the invention relates to improving the performance of data storage access by reading certain data from a data store only on an as-needed basis depending on one or more factors relating to the data or its access, and reading and caching other data in anticipation of a need to read such data based on one or more factors relating to such data or access thereto.

BACKGROUND

With reference to FIG. 1 as an example, a hierarchical data store 100 is used to store and retrieve hierarchical data. A node 105-125 in the hierarchy is referred to herein as a context. A context may be accessed by specifying a unique identifier or name, such as identifier "content" assigned to context 105, "roles" assigned to context 110, and "sales person" assigned to context 115.

A context comprises zero or more attributes. In FIG. 1, for example, context 115 has no attributes, while context 120 comprises three attributes 130, 140 and 145. Attributes may contain data—zero, one, or more, values—that may be accessed from a context, for example, by specifying an unique identifier or name associated with the attribute. Attribute 130, for example, has an identifier "application_id" that may be specified to obtain the string value "custxy12" from context 120, whereas attribute 140 has an identifier "title" that may be specified to obtain the string value "My Customers" from context 120. Attributes may store values in the form of numbers, dates, strings, multilingual text strings, binary strings or files, such as Binary Large Objects (BLOBs), or other types of values.

A well-known example of a hierarchical data store is a file system, wherein folders in a directory of the file system represent the contexts, or nodes, in the hierarchy. Each folder is identified by a name, which is unique at least when concatenated with the names of folders in the path from the root folder to the given folder in the hierarchy. Each folder comprises zero or more attributes. For example, a binary data file in a folder constitutes a binary attribute associated with the folder. Additional attributes associated with the folder include data such as owner, date of creation, modification, or last access. Other attributes include but are not limited to, physical or logical location, size, security, encryption, data compression, and archiving, attributes. Another example of a hierarchical data store is the Java Naming and Directory Interface (JNDI). FIG. 1 illustrates a portal content directory that may use, for example, a JNDI implementation to store data like user roles, pages and so on.

A persistent data store provides for persistent data, that is, a persistent data store maintains data for subsequent and repeated accesses, even when power is cycled to a device in which the persistent data store is located. The most common example of a persistent device is a permanent storage device such as a hard disk drive. It may be that the persistent device is accessed indirectly via a database. When an application retrieves data, the data are first read from a persistent data store into memory before such data can be passed to the application. This task typically is handled by a database management system and/or a file system. It is appreciated that such a read operation from a persistent device likely is significantly slower compared to a read operation from a volatile memory.

Read operations from persistent devices generally involve significant overhead versus read operations from memory. Take, for example, data read from a remote database accessible via an internetwork such as a large, distributed corporate intranet, or the Internet. In addition to delay associated with network access, query statements such as SQL statements may need to be compiled, and a search for the data performed against the remote database using database indexes. It is well understood that the overhead associated with reading data from persistent devices can be reduced if the persistent device is accessed less frequently, but more data are obtained at each access. For example, if an application accesses a context in a data store, then all attributes of the context could be read immediately from the persistent device and cached in a memory. If the, or another, application later accesses the attributes of the context, such subsequent access is relatively fast because the attribute data are already in memory. This concept may be extended by reading one or more subtrees of the hierarchical data store, that is, by reading one or more hierarchically lower contexts in the data store, further reducing overhead associated with accessing the data store. Indeed, caching the data in the memory is especially beneficial if the attributes are repeatedly accessed by one or more applications.

Optimizing read performance as described above by reading larger data blocks from a database (persistent data store) and caching the data in memory, and expecting the data to be requested by an application at a later point of time is referred to herein as anticipatory reading.

Generally speaking, it is beneficial to read all attributes of a context at one time, but there are also drawbacks. If available memory is limited, anticipatory reading from the persistent data store may affect system or memory performance, or even produce an out of memory error. Additionally, an application(s) may seldom access the attributes stored in memory, in which case, a better approach would be to load such attributes only on an as-needed basis. If an attribute, such as a Binary Large Object (BLOB) file, consumes relatively large amounts of memory when retrieved, then the attribute should be maintained in memory only when actually needed by the application. (If the application needs to access a binary file often, it can cache the binary file, rather than the file system or a database management system). Techniques that aim to reduce memory consumption and prevent unnecessary object instantiations by reading data only when really needed are generally referred to herein a lazy reading techniques.

SUMMARY

A method and apparatus to read data from a persistent data store is described. In general, instruction is provided whether to cache in a memory an attribute of a context at the time when the context is accessed from a permanent storage device. When the context is accessed from the permanent storage device, the attribute of the accessed context is also cached in the memory if so instructed.

Thus, in one example embodiment of the invention, an electronic computing system receives input indicating a preferred human-readable language in which to display output from a multilingual software program executing on the electronic computing system. The system further receives input indicating a non-preferred human-readable language in which to display output from the multilingual software program. The software program may request a data object that is located in a persistent data store. The data store may in fact store a number of human readable language translations of the data object, at least one of which is in the preferred human readable language, and at least one of which is in the non-preferred human readable language. The system performs an anticipatory read of the translation of the data object in the preferred human readable language, and performs a lazy read of the translation of the data object in the non-preferred human readable language.

DESCRIPTION OF THE DRAWINGS

The present invention is illustrated byway of example, and not by way of limitation, in the figures of the accompanying drawings in which.

DETAILED DESCRIPTION

Figure 3:
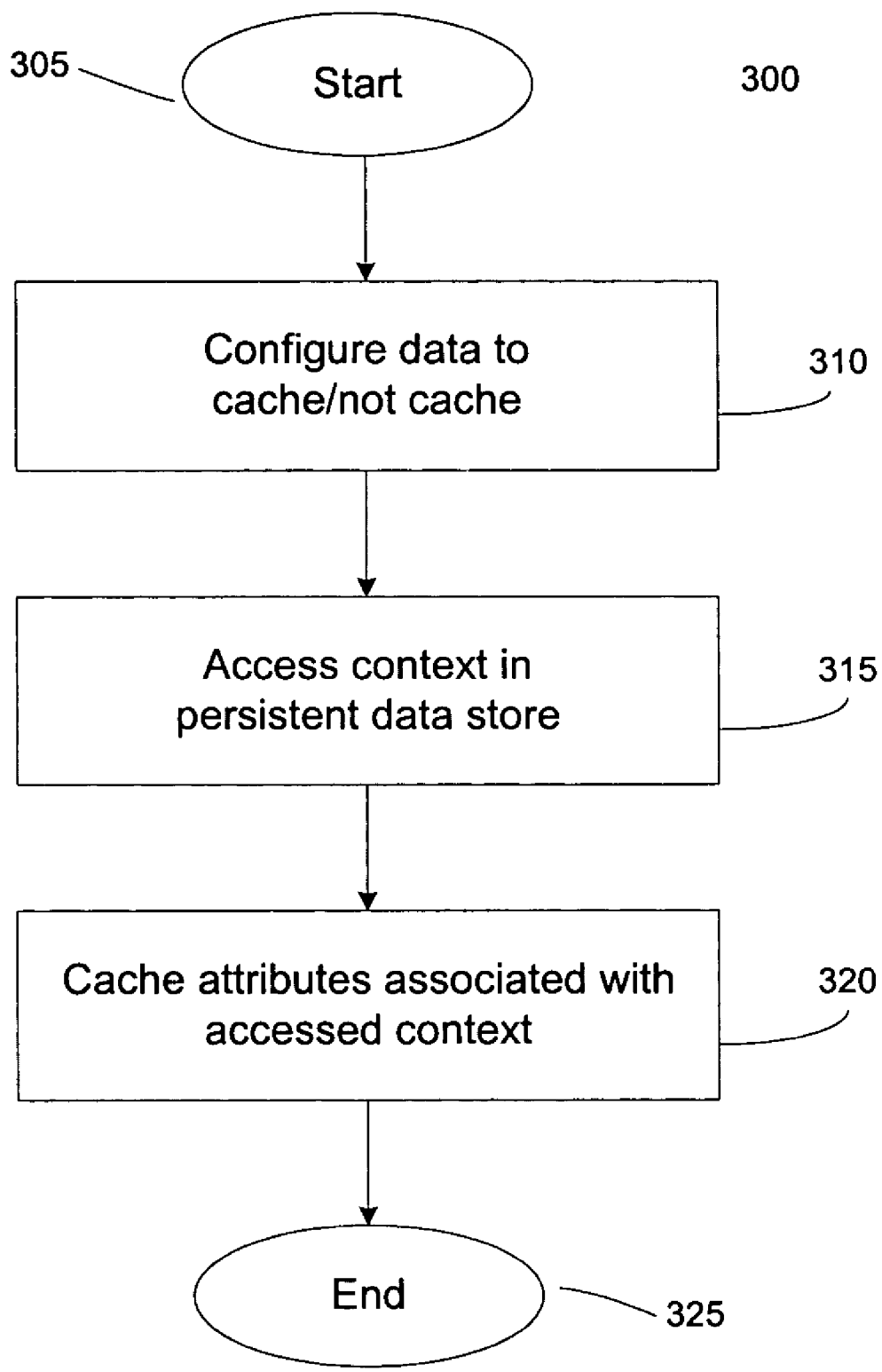
FIG. 3 is a flow diagram illustrating an embodiment of the invention.

The invention contemplates using lazy reading rather than anticipatory reading of data from a persistent data store for certain attributes. With reference to FIG. 3, the invention provides at 310 for configuring a computing system (global configuration), or an application installed on the computing system (application specific configuration), for example, by receiving input from a user, as to what attributes should be read lazy versus what attributes should be cached. Criteria for selecting which attributes to cache or not cache may be, for example, a name or identifier of an attribute, or a type of an attribute value, such as binary or text. In one embodiment of the invention, whether to cache data read from a persistent store may be governed by different values of an attribute, in particular, different values for text attributes, as described below in more detail. It should be noted that the computing system and/or the application may be implemented in a distributed or multi-tiered computing environment providing access to a centralized database maintained in a persistent manner.

A text attribute includes zero, one or more values. In one embodiment of the invention, it is comtemplated that each value consists of a descriptor value and a text string value, referred to herein as a descriptor-string pair. In one embodiment of the invention, every descriptor-string-pair value in an attribute represents a different human readable language translation of the same text string. A descriptor may provide a locale object that represents a specific geographical, political, or cultural region appropriate for the associated text string. For example, the locale object may specify a national or regional code appropriate for the language translation of the text string. In an alternative embodiment, a language code defines the locale object.

In other embodiments of the invention, the descriptor may provide such information as the grammar with which to parse the associated text string, the format of the text string (e.g., an XML or HTML formatted text string), a physical, logical or virtual network topographical location of the computing system in which an instance of an application requesting access to the attribute is executing, or the type of computing system (e.g., desktop computing system, personal digital assistant, wireless mobile communication device, etc) or other characteristics of the computing system (e.g., performance characteristics, hardware and/or software versions installed).

Text attributes are used in internationalized software applications and internationalized data content. For instance, SAP AG, the assignee of this patent, provides software applications that support more than 30 different languages. A user can configure in which human-readable language to provide input to and receive output from the software application. The language configuration may affect, for example, the language in which text (in titles, menus, buttons, descriptions and so on) is displayed via an output display device. It should be noted that while the described embodiments of the invention mention the use of descriptor-text string pair values for text attributes, it is appreciated that other embodiments may pair descriptors with other kinds of attribute values common or appropriate to other types of attributes besides text attributes.

In software applications accessing multilingual data content from a persistent store, different language translations of various text string values may represent a significant proportion of memory consumed by such applications. However, it is likely that depending on the users of a certain software installation, the text values are requested in some languages translations more often than in other language translations, and in fact, there might be some language translation that are not used at all in some software installations.

If lazy reading solely is performed on text string values, it ensures that only the text strings in the language translations that are really needed are, in fact, read from persistent storage. Lazy reading decreases read performance, but for translations in languages rarely accessed this decrease in reading performance likely is acceptable. On the other hand, better reading performance is desired for translations in languages primarily accessed by software applications. The invention therefore combines anticipatory reading and caching together with lazy reading based on attributes types and/or attribute values.

It is contemplated that lazy reading versus anticipatory reading and caching of attribute values, for example, multilingual text strings, is configurable by the administrator of the software application(s) that will access the text strings. Essentially, the administrator can switch on and switch off lazy reading of text, either on a global basis or a per application basis. If lazy reading is switched on, then the administrator can define and configure preferred locales associated with certain language translations. A preferred locale is associated with language translations of text strings expected to be or actually often accessed by users of the software applications. For text in language translations associated with the preferred locales, lazy reading is not applied, that is, the text attributes are read when the context with which they are associated are accessed at 315 in persistent store, and then cached at 320 in anticipation of subsequent requests for such text attributes from one or more software applications. It should be noted that lazy reading of attribute values such as multilingual text strings does not affect the functionality of a software application. The text strings are still available for all locales supported by the software or contained in the content.

If a user requests access to a text attribute specifying a locale that is not preferred, generally the language translation of the text string value for the text attribute is read directly from the persistent store, thereby preventing anticipatory reading and caching into memory of less commonly accessed, or at least non-preferred, language translations of text string values. In one embodiment of the invention, the hierarchical store maintains the non-preferred text string in cache so long as the associated context is maintained in cache, so that repeated accessing of the non-preferred text is relatively fast.

As noted above, when lazy reading is performed on an attribute, the hierarchical store retrieves the required data from the persistent store. Thus, the hierarchical store needs to know where the required data are stored. In one embodiment of the invention, the information identifying the location of the data is maintained in the attribute because an attribute may be stored independently from an associated context in the memory.

If the persistent store is a relational database, the information identifying the location of the data is, for instance, a database table and a key of the table row. In one embodiment of the invention, the database table in which the translations are located can be designed in a way that language translations of a text string can be retrieved using a single SQL query. The search condition can be shared among all attribute values for the different language translations. Further assuming that the descriptor (locale) is part of the table key, then one can execute a query that returns exactly the language translation for a specific locale.

Figure 1:
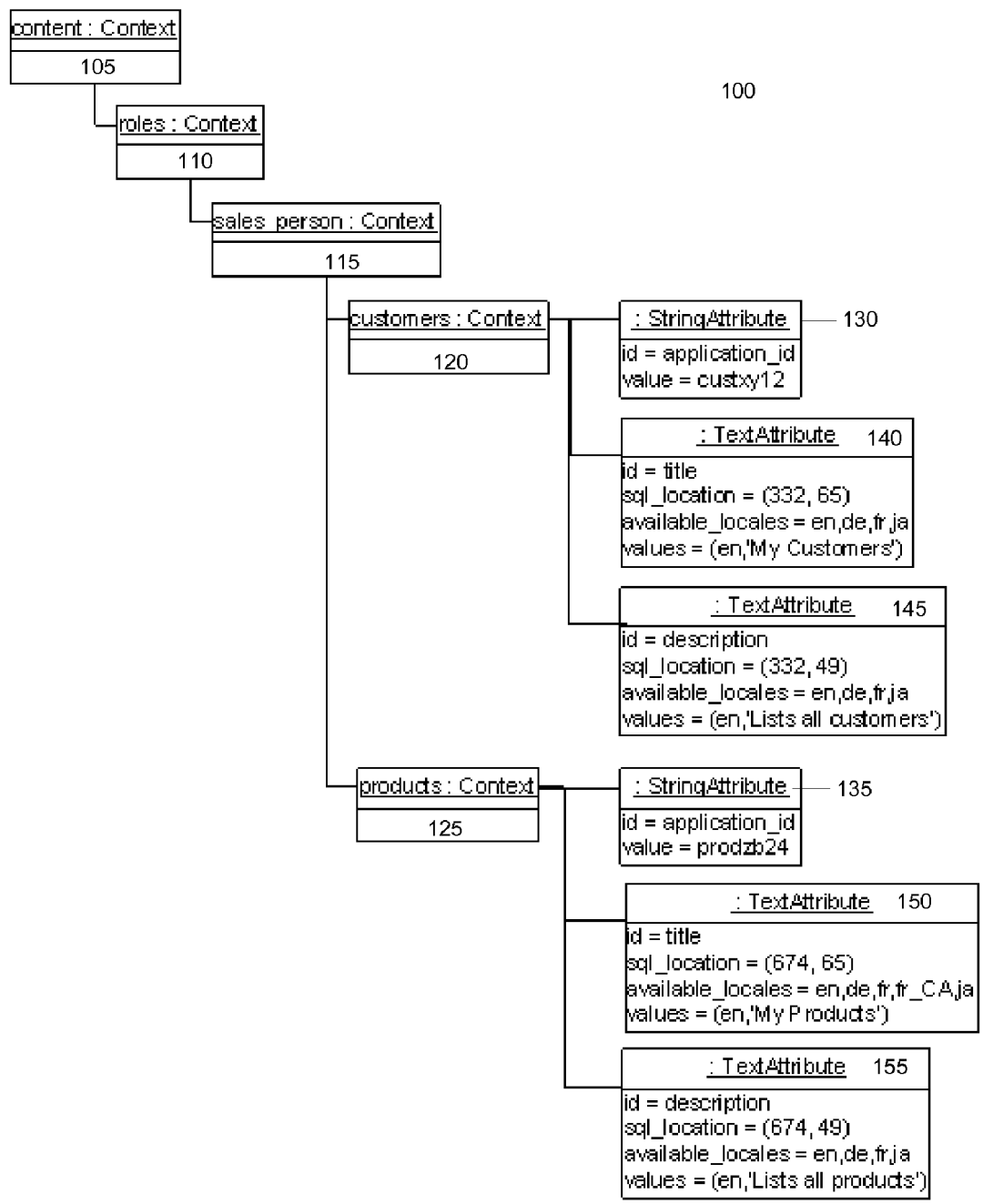
FIG. 1 illustrates a hierarchical data store on which an embodiment of the invention operates.
Figure 2:
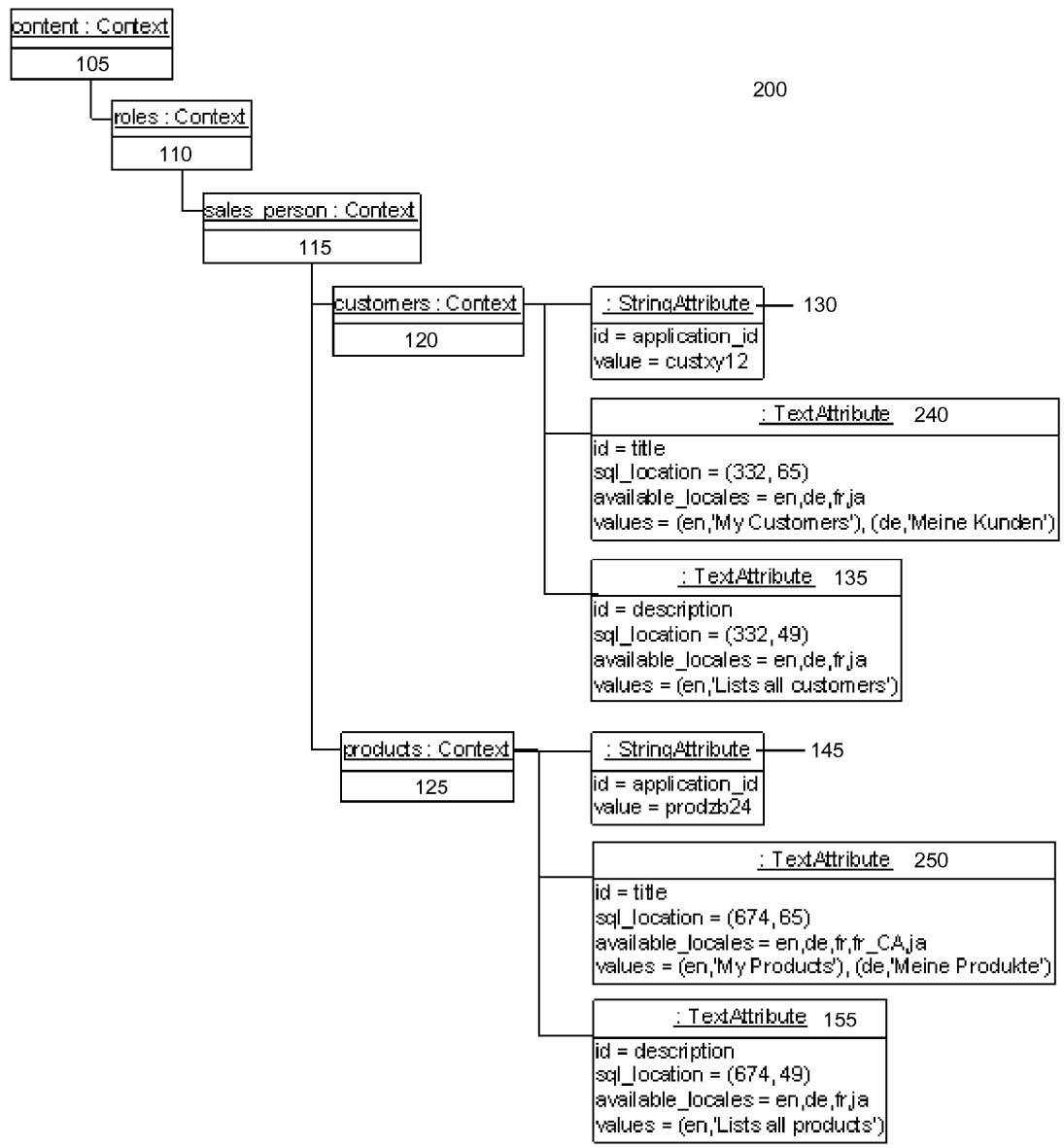
FIG. 2 illustrates a hierarchical data store on which an embodiment of the invention operates.

A simplified example of an implementation of an embodiment of the invention follows, with reference to FIGS. 1 and 2. A hierarchical data store is accessible to an enterprise portal software application installation. In the enterprise portal installation, a role for sales persons is deployed. Assigned to this role are two applications used by sales persons. If a sales person logs into the portal then the titles of the two applications are displayed on a display screen together with a start-button and a help-button. By pressing a help-button (e.g., by moving a cursor over the help-button on the display screen and clicking a mouse button to select the help-button), a description of the applications is displayed. Pushing the start-button launches the appropriate application, for example, in another window on the display screen.

For the sake of this example, assume the enterprise portal is located in Detroit, Mich. Most of the users are Americans using the English locale. The administrator of the enterprise portal configured the English locale as the only preferred locale at the time of installation. Furthermore, the portal is configured to enable lazy text reading Charles, Heather and James are sales persons. On a given day, Charles logs into the portal using his English locale. On such day, Charles is the first sales person logging into the portal. A role 110 is read from a database. Since English is the preferred locale, all English language translations are loaded as well. The English language translations of the application titles are displayed on the display screen. Charles pushes a help button for one application. Since the English language description is in the cache as well this causes no additional database (persistent storage) activity. FIG. 1 displays an Object diagram 100 of the role after this first access.

Ulrike is a German sales person. She prefers to log into the portal using the German locale. She later logs into the portal on the same day as Charles. When she logs into the portal the role is already loaded. However, German language translations of the application titles need to be loaded from the database. Ulrike is experienced, so she does not push a help-button and the German descriptions are not loaded. When Dirk, another German sales person, later the same day logs into the portal, the German titles of the applications are already in cache. FIG. 2 displays the Object diagram of the role after the login with the German locale.

In one embodiment of the invention, configuring the attributes for lazy or anticipatory read, for example, by specifying preferred descriptors (locales) can be accomplished via manual input from an administrator. In another embodiment, the application keeps track of the locales associated with attribute values, e.g., text strings, read from the hierarchical store. A statistical measure can be maintained indicating the frequency of usage of each locale. The application can periodically generate a proposal for the administrator, stating the locales to be configured as preferred locales. In another embodiment of the invention, the hierarchical store changes the configuration of the preferred locales based on the statistical measure indicating the frequency of usage of each locale.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A system, comprising:
   a permanent storage device in which to store a plurality of contexts, each context to comprise a plurality of attributes, each of the plurality of attributes to comprise a plurality of values;
   a file system with which to read values from the contexts;
   a volatile memory comprising a region for a cache in which to store the values to be read by the file system; and
   logic to indicate to the file system the values to read from the contexts and store in the cache region and the values to read into a region of volatile memory other than the cache region.

2. The system of claim 1, wherein a database comprises the plurality of contexts, the permanent storage device to store the database.

3. The system of claim 2, wherein the logic to indicate the values to store in the cache region includes logic to indicate a type of attribute comprising a plurality of values to store in the cache region.

4. The system of claim 3, wherein the type of attribute is a text attribute.

5. The system of claim 4, wherein a text attribute comprises a plurality of text values, each text value comprising a descriptor and associated text string.

6. The system of claim 5, wherein the descriptor specifies at least one of a plurality of country code values, and the logic to indicate the values to store in the cache region to indicate at least one country code value of the associated text strings to store in the cache region.

7. The system of claim 5, wherein the descriptor specifies at least one of a plurality of language values, and the logic to indicate the values to store in the cache region to indicate at least one language value of the associated text strings to store in the cache region.

8. A method, comprising:
providing instruction whether to anticipatory read or lazy read an attribute of a context when the context is accessed in a permanent storage;
accessing the context in the permanent storage;
reading the attribute of the accessed context according to the instruction; and
sending the attribute to an output or to a software application.

9. The method of claim 8, wherein providing instruction whether to anticipatory read or lazy read the attribute comprises receiving user input whether to anticipatory read or lazy read the attribute.

10. The method of claim 8, wherein accessing the context comprises accessing the context from one node in a hierarchy of nodes stored in the permanent storage.

11. The method of claim 8, wherein providing instruction whether to anticipatory read or lazy read the attribute comprises providing instruction to anticipatory read or lazy read based on a type of attribute, and wherein reading the attribute according to the instruction comprises reading the attribute-based on the type of the attribute.

12. The method of claim 8, wherein providing instruction whether to anticipatory read or lazy read the attribute comprises providing instruction to anticipatory read or lazy read an attribute based on an identifier of the attribute, and wherein reading the attribute according to the instruction comprises reading the attribute based on it's identifier.

13. The method of claim 8, wherein providing instruction whether to anticipatory read or lazy read the attribute comprises providing instruction to anticipatory read or lazy read an attribute based on a value of the attribute, and wherein reading the attribute according to the instruction comprises reading the attribute based on the value of the attribute.

14. A method, comprising:
configuring whether to anticipatory read or lazy read one of a plurality of attribute values associated with a context if the context is accessed in a persistent store;
accessing the context in the persistent store;
reading the one attribute value associated with the context in response to the context being accessed according to the configuration; and
sending the attribute to an output or to a software application.

15. The method of claim 14, further comprising:
receiving a request for a second of the plurality of attribute values associated with the context;
reading the second attribute value in response to the request according to the configuration; and
sending the second attribute value to an output or to a software application.

16. The method of claim 14, wherein each attribute value comprises a descriptor-text string pair, and wherein configuring whether to anticipatory read or lazy read one of a plurality of attribute values comprises configuring whether to anticipatory read or lazy read one of the plurality of attribute values based on its descriptor.

17. The method of claim 16, wherein the descriptor specifies one of a geographical, political and cultural locale.

18. The method of claim 16, wherein the descriptor specifies a language for the text string.

19. The method of claim 16, wherein the descriptor specifies a grammar for the text string.

20. The method of claim 16, wherein the descriptor specifies a data network topographical locale.

21. The method of claim 16, wherein the descriptor specifies a type of an electronic device.

22. The method of claim 14, wherein each attribute value comprises application specific content, and wherein configuring whether to anticipatory read or lazy read one of a plurality of attribute values comprises configuring whether to anticipatory read or lazy read one of the plurality of attribute values based on its content.

23. In an electronic computing system, a method comprising:
receiving input indicating a preferred human-readable language in which to display output from a multilingual software program executing on the electronic computing system;
receiving input indicating a non-preferred human-readable language in which to display output from the multilingual software program;
locating a plurality of human readable language translations of a data object in a persistent data store coupled with the electronic computing system, at least one of which translations of the data object is in the preferred human readable language, and at least one of which is in the nonpreferred human readable language;
anticipatory reading the translation of the data object in the preferred human readable language in anticipation of a request for such data object from the multilingual software program;
lazy reading the translation of the data object in the non-preferred human readable language in response to a request for such data object; and
displaying the translation of the data object.

24. An article of manufacture comprising a computer readable storage medium having instructions that when executed by a electronic computing system, cause such system to:
indicate whether to anticipatory read or lazy read an attribute of a context when the context is accessed in a permanent storage;
access the context in the permanent storage;
read the attribute of the accessed context according to the instruction; and
send the attribute to an output or to a software application.

25. The article of manufacture of claim 24, wherein the instruction that causes such system to indicate whether to anticipatory read or lazy read the attribute comprises instruction that causes such system to receive user input whether to anticipatory read or lazy read the attribute.

26. The article of manufacture of claim 24, wherein the instruction that causes such system to indicate whether to anticipatory read or lazy read the attribute comprises instruction that causes such system to anticipatory read or lazy read based on a type of attribute, and wherein to read the attribute according to the instruction comprises to read the attribute-based on the type of the attribute.

27. The article of manufacture of claim 24, wherein the instructions that cause such system to indicate whether to anticipatory read or lazy read the attribute comprises instructions that cause such system to anticipatory read or lazy read an attribute based on a value of the attribute, and wherein to read the attribute according to the instruction comprises to read the attribute based on the value of the attribute.

28. An article of manufacture comprising a computer readable storage medium having instructions that when executed by a electronic computing system, cause such system to:
configure whether to anticipatory read or lazy read one of a plurality of attribute values associated with a context when the context is accessed in a persistent store;
access the context in the persistent store;
read the one attribute value associated with the context in response to the context being accessed, according to the configuration; and
send the one attribute value to an output or to a software application.

29. The article of manufacture of claim 28, wherein each attribute value comprises a descriptor-text string pair, and wherein the instructions that cause the system to configure whether to anticipatory read or lazy read one of a plurality of attribute values comprises instructions that cause the system to configure whether to anticipatory read or lazy read one of the plurality of attribute values based on its descriptor.

30. The article of manufacture of claim 29, wherein the descriptor specifies one of a geographical, political and cultural locale.

31. The article of manufacture of claim 29, wherein the descriptor specifies a language for the text string.

32. The article of manufacture of claim 29, wherein the descriptor specifies a grammar for the text string.

* * * * *